United States Patent [19]

Haditsch

[11] Patent Number: 4,701,648
[45] Date of Patent: Oct. 20, 1987

[54] CONDUCTOR WINDING ASSEMBLY FOR A GAS-COOLED ELECTRIC MACHINE

[75] Inventor: Werner Haditsch, Nussbaumen, Switzerland

[73] Assignee: BBC Brown, Boveri & Company, Limited, Baden, Switzerland

[21] Appl. No.: 875,731

[22] Filed: Jun. 18, 1986

[30] Foreign Application Priority Data

Jun. 27, 1985 [CH] Switzerland .................. 2726/85

[51] Int. Cl.$^4$ .................. H02K 1/32; H02K 3/24
[52] U.S. Cl. .................. 310/61; 310/42; 310/214; 411/504; 29/522 R
[58] Field of Search .................. 29/422 R, 526 R; 174/15 C, 16 B, 94 R; 310/42, 54, 60 A, 61, 214, 216, 261; 336/210, 216; 403/272, 274, 278, 282, 297, 355, 402; 411/501, 504–507

[56] References Cited

U.S. PATENT DOCUMENTS

| | | | |
|---|---|---|---|
| 2,863,185 | 12/1958 | Riedi | 29/522 |
| 2,870,881 | 1/1959 | Rogge | 29/522 |
| 3,482,865 | 12/1969 | Haller | 403/282 |
| 4,250,424 | 2/1981 | Sento et al. | 310/42 |
| 4,389,589 | 6/1983 | Schuster | 411/501 |

FOREIGN PATENT DOCUMENTS 868467 5/1961 United Kingdom .................. 310/61

Primary Examiner—Patrick R. Salce
Assistant Examiner—D. L. Rebsch
Attorney, Agent, or Firm—Oblon, Fisher, Spivak, McClelland & Maier

[57] ABSTRACT

In electric machines having gas-cooled rotor windings which consist of part conductors (5,6) which are placed on top of each other and have an E or U section, relative movements between the part conductor pairs occur during shaft rotation which generate copper abrasion. Such relative movements are inexpensively prevented by a "covered" riveting of the part-conductor pairs.

11 Claims, 6 Drawing Figures

CONDUCTOR WINDING ASSEMBLY FOR A GAS-COOLED ELECTRIC MACHINE

FIELD OF THE INVENTION

The invention relates to a rotor of an electric machine having a gas-cooled rotor winding the winding conductors of which are inserted into slots in the rotor body, are insulated from the rotor body, and secured in the slots by slot wedges.

BACKGROUND OF THE INVENTION

In large turbo-generators having a gas-cooled rotor winding, winding conductors are increasingly used which consist of two part conductors with E or U section which are placed on top of each other. Such a construction facilitates the mechanical machining of the winding, particularly in producing penetrations, recesses, and similar passages for supplying and removing the cooling gas (see German Patent Specification No. 11 64 564, FIG. 4, item 26).

In this arrangement, the part conductors are merely placed on top of each other. Support against centrifugal forces is provided by the slot wedge and in the lateral direction by the slot insulation.

In normal machine operation, the part conductors are pressed on top of each other due to the action of centrifugal forces in such a manner that relative movements in the peripheral direction between part conductors resting on top of each other are virtually impossible. When the shaft is rotating during cooling at low rotational speed (typically 50 revolutions per minute), in contrast, such relative movements occur which are not only capable of damaging the winding insulations but also generate abrasion of the conductor material which is distributed in the entire cooling system. Such damage to the winding insulations can impair the electric characteristics and can lead to winding or ground leakage of the rotor winding.

A material-locked bonding of the two part conductors by means of hard soldering is not possible because hard soldering would cause soft annealing of the conductor material, which is not permissible. Soft soldering, for example with the aid of thin solder foils, does not lead to any reliable bonding between the part conductors. Soldering agent emerging under full load can cause contamination of the cooling system.

OBJECT OF THE INVENTION

On the basis of the prior art described above, the invention is based on the object of improving a rotor winding of the generic type initially mentioned in such a manner that no relative movements between part conductors resting on top of each other can occur in any operating condition of the electric machine, that is to say particularly also during shaft rotation.

SUMMARY OF THE INVENTION

The core of the invention lies in the "covered" riveting of the part conductors. In this manner, the two part conductors are joined to each other in such as manner that they can withstand all loads occurring perpendicularly to the plane of separation during the installation of the winding and all loads occurring during operation in the direction of the plane of separation of the part conductors. Subsequent machining of the conductor surfaces after joining, which is unavoidable, for example, with electron-beam welding, can be omitted.

The development of the subject-matter of the invention with strip- or band-like riveting elements and correspondingly constructed recesses in the legs of the part conductors is characterized by economy. This particularly applies to part conductors which are already provided with the continuous slots during the part-conductor production, that is to say during the drawing of the extrusion. In addition, the legs of the part conductors can also be provided with a plurality of separate recesses which are preferably flush with each other and into which correspondingly dimensioned riveting elements are inserted. In the boundary case these are individual (for example, circular drilled holes and, correspondingly, cylindrical riveting elements.

In the case of part conductors having an E section, it is as a rule sufficient to provide the riveting connection on the central leg. In the case of part conductors having a U section, either both legs or at least alternately one and the other leg must be riveted.

BRIEF DESCRIPTION OF THE DRAWINGS

In the text which follows, the invention is explained in greater detail with the aid of the drawings, in which illustrative embodiments are illustrated and in which.

DETAILED DESCRIPTION OF THE PRESENTLY PREFERRED EMBODIMENT

Figure 1:
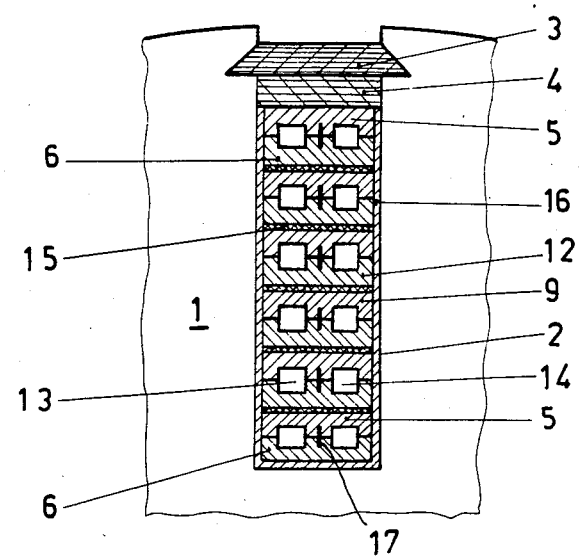
FIG. 1 shows a cross-section through the rotor of a turbo-generator having a gas-cooled rotor winding.

In FIG. 1, a slot 2 is arranged in a rotor body 1. The slot 2 (and other similar slots) extends in the axial direction of the rotor body 1. A rotor winding is clamped in the slot 2, secured by a slot wedge 3 and a wedge support 4. The rotor winding consists of a number of winding conductors which are insulated from each other. Each winding conductor is composed of two part conductors 5, 6 made of hard copper. The part conductor 5,6 are constructed to be approximately E-shaped. The legs 7,8,9 of the part conductor 5 and the legs 10,11,12 of the part conductor 6 are placed on top of each other in such a manner that longitudinal ducts 13,14 are formed between the part conductors 5 and 6. The longitudinal ducts 13,14 pass through the entire rotor.

The part-conductor pairs 5,6 are insulated from each other by insulating layers 15. The winding conductors are insulated from the rotor body 1 by an insulating slot lining 16.

Figure 2:
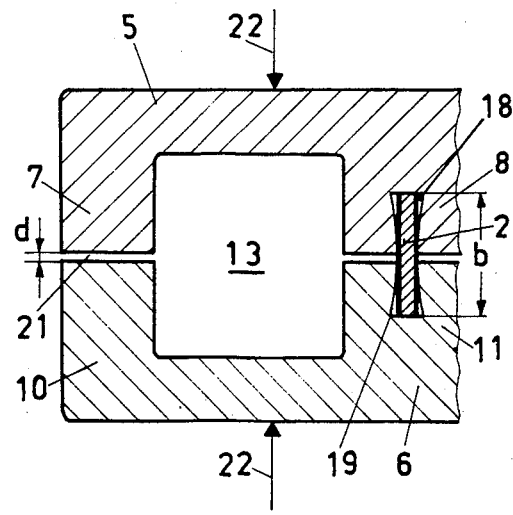
FIG. 2 shows a cross-section through a part-conductor pair before the riveting.
Figure 3:
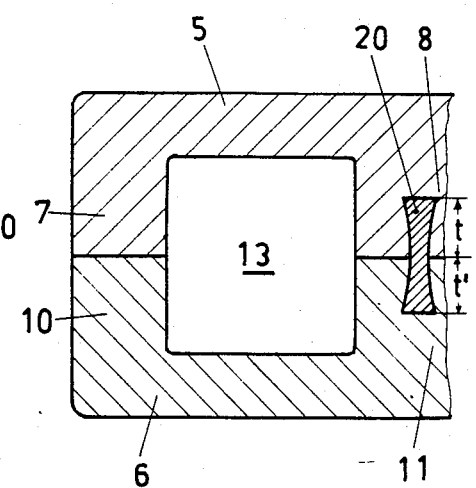
FIG. 3 shows a cross-section through the part-conductor pair according to FIG. 2 after the pressing together (riveting)

In the text which follows, the riveting connection between the part conductors, which is symbolized in FIG. 1 by the reference number 17, is explained in greater detail with the aid of FIGS. 2 and 3.

Each part conductor 5, 6 has in its central leg 8 and 11 respectively, a continuous slot 18 and 19 which extends in the longitudinal direction of the associated part conductor 5,6 and which, in the case of the example, has a dove tail-shaped cross-section. Its mean width is at a maximum half the leg width. Its depth t, t' corresponds at a maximum to the leg height.

Before the two part conductors 5,6 are placed on top of each other, a riveting element in the shape of a soft copper strip 20 is inserted into the slot 19 in the lower part conductor 6. The projecting half of the soft copper strip 20 engages the slot 18 in the upper part conductor 5 during the joining together. The thickness of the soft copper strip 20 approximately corresponds to the width of the slot 18 and 19 in their areas close to the surface.

The width b of the soft copper strip 20 is greater by between 0.3 and 0.8 mm than the sum of the slot depths t, t'. In this manner, a gap 21 forms when the two part conductors 5, 6 are joined together.

Pressing the two part conductors 5, 6 together in the direction of the arrows 22, the soft copper strip 20 is plastically deformed and more or less completely fills out the two slots, as can be seen from FIG. 3. The completeness of the filling-out depends on the free volume in the two slots 18, 19 and on the volume of the soft copper strip 20. The completeness of the filling-out can be simply calculated with a given slot geometry. Per unit length of the soft copper strip 20, the free volume in the slots 18, 19 must correspond to the volume of the soft copper strip 20 which is limited by the surfaces, facing each other, of the legs 8 and 11, assuming that the conductor material (hard copper as a rule) either does not become deformed at all or only becomes insignificantly deformed.

The "riveting together" of the two part conductors can be carried out section by section, for example in a simple press, or continuously between rollers. For both cases, lateral guide means, for example guide rollers which cover both part conductor side faces are expedient.

Figure 4:
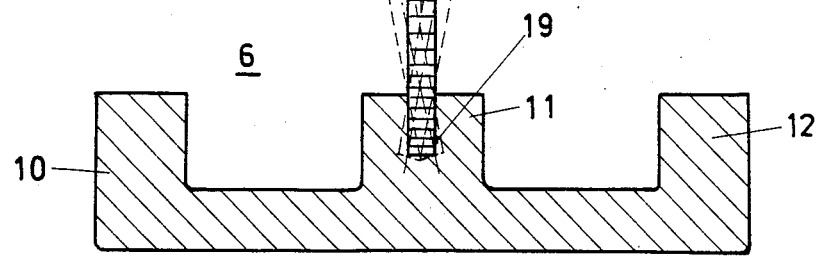
FIG. 4 is a sketch to illustrate the insertion of a slot in the central leg.

Insertion of the dove tail-shaped slot into the central leg 8 and 11 can be carried out, for example, by cutting machining with a disc milling cutter 23 which is firstly applied perpendicular to the front face of the leg 8, 11 and subsequently at angles of 90° +α and 90° −α as is illustrated in FIG. 4.

Another possibility of inserting continuous slots 18 and 19, which is more appropriate to series production, consists in producing these slots during the production of the part that is to say during the extrusion drawing of the half-finished product.

Figure 5:
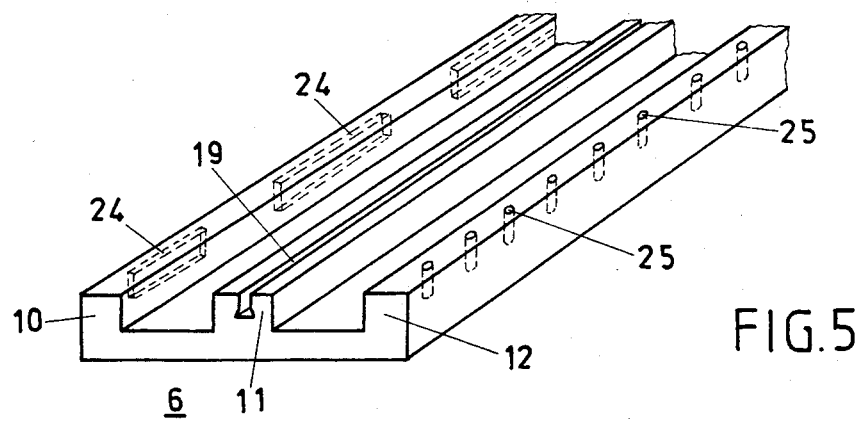
FIG. 5 is a perspective representation of a part-conductor section having various types of recesses for accommodating riveting elements.

In FIG. 5, various configurations of recesses for accommodating riveting elements are shown by way of example.

In addition to a continuous slot 19, interrupted slots 24 or even drilled blind holes 25 can be arranged in only one and/or the other legs 10, 11, 12.

Figure 6:
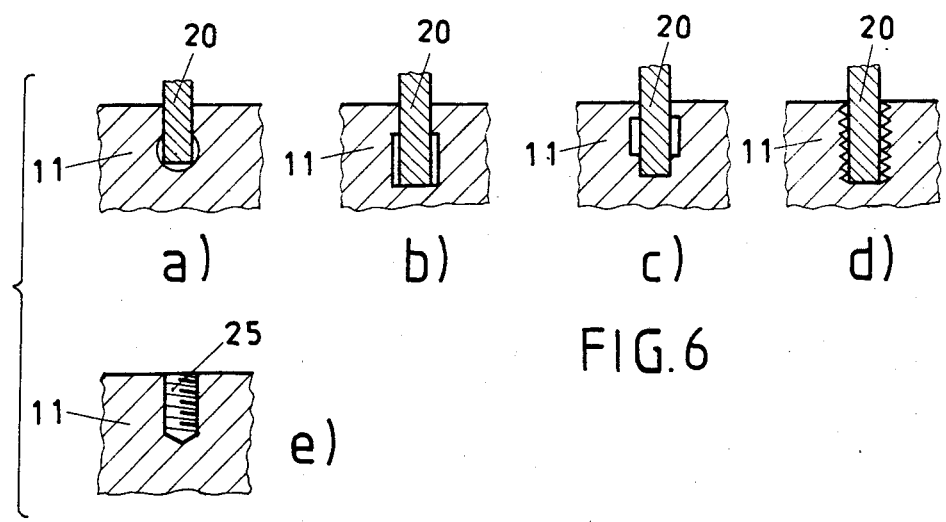
FIG. 6 shows various geometries of the recesses.

FIG. 6 shows various slot geometries which can be used in accordance with the invention.

FIG. 6a shows a slot having a parallel section having a width which approximately corresponds to the thickness of the soft copper strip 20 in the area of the slot close to the surface, which section continues in a round or oval section.

The slot shape according to FIG. 6b has in its area close to the surface a parallel section the width of which corresponds to the thickness of the soft copper strip 20 and which is joined to an expanded section.

The slot shape according to FIG. 6c corresponds to that of FIG. 6b.

FIG. 6d shows a slot shape in which the slot sides are knurled or grooved.

Finally, FIG. 6e shows a recess in the form of a threaded drilled blind hole 25 (see FIG. 5, right-hand half).

All geometries of FIG. 6 have the common feature that, after introduction of the riveting element 20, a free volume remains in the interior of the recess which is filled by the compression of the riveting element.

As has already been indicated in the introduction, use of the teaching according to the invention is not restricted to part conductors having an E section. In the case of part conductors having a U section, that is to say only two legs, the recesses are inserted into both legs or alternately into one and the other leg. The solution with one or two continuous slots and correspondingly continuous soft copper strips 20, or such which are placed closely together behind one another, is to be preferred because it is only in this manner that the conductor cross-section is not weakened and thus the current carrying capability is the same as in the case of a conventional part conductor.

I claim:

1. A rotor for an electric machine, said rotor comprising a rotor body (1) having at least one gas-cooled rotor winding comprising a plurality of winding conductors, said winding conductors being inserted into slots (2) in said rotor body (1), insulated from said rotor body (1), are being secured by slot wedges (3), said winding conductors being assembled from two part conductors (5,6) which are constructed to be approximately U- or E-shaped and the legs of which (7,8,9,10,11,12) are placed against each other in such a manner that at least one longitudinal duct (13,14) is formed between said two part conductors (5,6), said at least one longitudinal duct (13,14) passing completely through said rotor body (1) in the longitudinal direction, said two part conductors (5,6) being riveted together by solid riveting elements (20) disposed only in the legs (7 to 12) of said two part conductors (5,6) without intersecting the surface of said winding conductors.

2. A rotor as claimed in claim 1, wherein:
   (a) said solid riveting elements (20) are disposed in recesses (18,19) constructed as slots (18,19) which extend over the entire length of said two part conductors (5,6) and
   (b) said riveting elements are strips (20) of soft copper.

3. A rotor as claimed in claim 1, wherein said solid riveting elements (20) are disposed in recesses (18,19) which have in the area close to the surface a width which at least approximately corresponds to the thickness of said solid riveting elements (20) and which have in the interior of each recess (18,19) a free volume which is filled at least partially by the associated solid riveting element (20).

4. A rotor as claimed in claim 3, wherein the width (b) of each one of said solid riveting elements (20) is greater than the sum of the depths (t, t') of the associated one of said recesses (18,19).

5. A rotor as claimed in claim 1, wherein said solid riveting elements (20) are made of a material which is softer than the conductor material.

6. A rotor as recited in claim 4 wherein the width (b) of each one of said solid riveting elements (20) is greater than the sum of the depths (t, t') of the associated one of said recesses by 0.3 to 0.8 mm.

7. A rotor as claimed in claim 5 wherein said solid riveting elements are made of soft copper.

8. A rotor for an electric machine, said rotor comprising:
   (a) a rotor body having a cylindrical outer surface symmetrical about an axis, said rotor body having at least one slot extending axially of said rotor body and communicating with said cylindrical outer surface of said rotor body;
   (b) a plurality of winding conductors disposed in said at least one slot in radial array, each one of said winding conductors being composed of a pair of part conductors each of which is U- or E-shaped in cross-section, the legs of each one of each pair of associated part conductors ending in an at least approximately planar surface placed against a corresponding at least approximately planar surface on the other one of each pair of associated part conductors so that at least one longitudinal duct is formed between each pair of associated part conductors, at least one recess being formed in said at least approximately planar surface in one of each pair of associated part conductors and a communicating recess being formed in said at least approximately planar surface in the other one of each pair of associated part conductors, said recesses having a narrower width at their openings to the associated at least approximately planar surface than their width at at least one interior point; and
   (c) a solid rivet at least substantially filling said at least one recess and said communicating recess to bind each pair of associated part conductors together.

9. A rotor as recited in claim 8 wherein:
   (a) said at least one recess and said communicating recess in each pair of associated part conductors are axially extending slots and
   (b) said solid rivets are axially extending strips.

10. A rotor as recited in claim 8 wherein said solid rivets are made of a material that is softer than the material of which said part conductors are made.

11. A rotor as recited in claim 10 wherein said solid rivets are made of soft copper.

* * * * *